March 12, 1963  O. J. WHITTEMORE, JR  3,081,249
PROCESS OF MAKING A NUCLEAR FUEL ELEMENT
Original Filed May 21, 1957
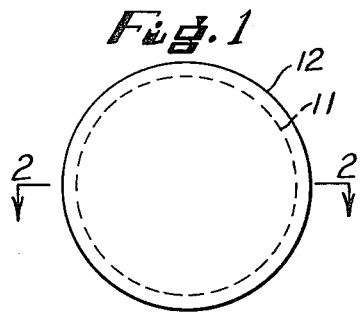
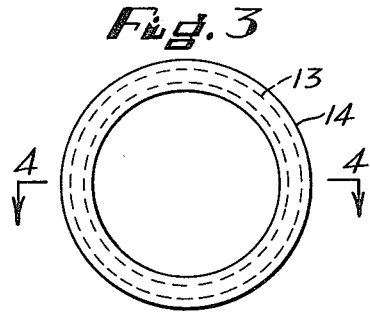
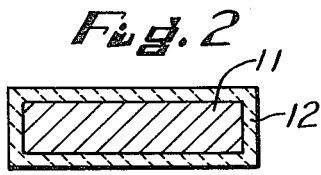
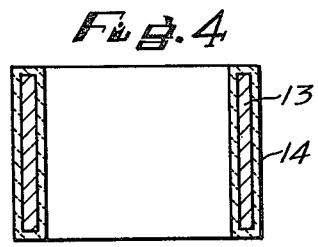
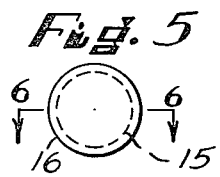
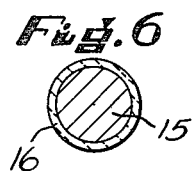
*INVENTOR.*
OSGOOD J. WHITTEMORE JR.
ATTORNEY ища
United States Patent Office 3,081,249
Patented Mar. 12, 1963

3,081,249
PROCESS OF MAKING A NUCLEAR FUEL ELEMENT
Osgood J. Whittemore, Jr., Princeton, Mass., assignor to Norton Company, Worcester, Mass., a corporation of Massachusetts
Original application May 21, 1957, Ser. No. 660,635. Divided and this application Nov. 9, 1959, Ser. No. 851,852
1 Claim. (Cl. 204—193.2)

The invention relates to ceramic nuclear fuel elements. This application is a division of my copending application Serial No. 660,635 filed May 21, 1957, now abandoned.

One object of the invention is to provide a nuclear fuel element which is resistant to corrosion. Another object of the invention is to provide a nuclear fuel element that is resistant to high temperatures. Another object of the invention is to provide a nuclear fuel element having a casing which will retain fission products to keep them out of the coolant.

Another object of the invention is to provide, along with one or more of the advantageous features above indicated, uranium in mechanical form which is substantially noncorrosive and highly refractory. Another object of the invention is to provide a nuclear fuel element which is more resistant to structural damage from nuclear radiation provided by others of the same kind or different kind.

Another object of the invention is to provide a nuclear fuel element capable of being amassed into a reactor so that the coolant, for example water or helium, can be passed through the reactor without the provision of separate conduits, namely just flowed through the spaces between stacked elements.

Other objects will be in part obvious or in part pointed out hereinafter.

In the accompanying drawings illustrating without limitation a number of geometrical shapes for my ceramic nuclear fuel elements, FIGURE 1 is a plan view of an element of disc shape,
FIGURE 2 is a sectional view along the line 2—2 of FIGURE 1,
FIGURE 3 is a plan view of a fuel element of hollow cylindrical shape,
FIGURE 4 is a sectional view along the line 4—4 of FIGURE 3,
FIGURE 5 is a plan view of a fuel element of spherical shape,
FIGURE 6 is a sectional view taken along the line 6—6 of FIGURE 5.

Referring to the drawings, I provide a fuel core in the shape of a disc 11, FIGURES 1 and 2, a hollow cylinder 13, FIGURES 3 and 4 and a sphere 15, FIGURES 5 and 6. Around the fuel core I press and fire, or slip cast and fire, or coat and sinter, a sheath or casing 12, FIGURES 1 and 2; 14, FIGURES 3 and 4; 16, FIGURES 5 and 6. These shapes above described and clearly apparent from the drawings are illustrative only and the fuel element which is the composite of the fuel core 1, etc. and the sheath 2, etc. can be of any reasonable shape in accordance with my invention which relates to the combination of materials and their structure of an integral two part element.

The fuel cores, 11, 13 and 15 are made of ceramic oxide the active part of which is fissionable element material such as uranium 235, plutonium 239 and/or uranium 233. Fertile elements such as thorium 232 and/or uranium 238 in oxide form may be in admixture therewith or may be used alone. Other isotopes combined with oxygen of the elements uranium, plutonium and thorium may be included. Other oxides as moderators or as material of low nuclear captive cross section can be included. Examples of these are alumina, $Al_2O_3$, magnesia, $MgO$, zirconia, $ZrO_2$, cerium oxide, $CeO_2$, beryllia, $BeO$ and lime $CaO$ as a stabilizer of zirconia. Beryllia is a moderator, the others are of low nuclear captive cross section, termed diluents.

The sheath or casings 12, 14 and 16 should be essentially free from elements having high neutron captive cross section, such as boron, cadium, hafnium, cobalt, manganese, neodimium, samarium, europium, gadolinium, terbium, dysprosium, holmium, erbium, thulium and ytterbium. Except for the first five, these elements are rare earth elements which are found in admixture with each other and are many of them constituents of thorium oxide ores such as monazite. Hafnium is found as a usual constituent of zirconia ores such as zircon and baddelyite. Therefore the hafnia content of zirconia should be removed in a known manner. I can tolerate as much as 100 parts per million of each of these or any of them provided that there be not more than 30 parts per million of any of Sm, Eu and Gd.

The oxides which I can use for the sheath, which can be made of any combination of any number of them, are alumina $Al_2O_3$, magnesia $MgO$, zirconia $ZrO_2$, cerium oxide, and thoria $ThO_2$.

The sheaths 12, 14 and 16 should be dense, that is essentially impervious. This is achieved by any of the methods of fabrication herein pointed out. Provided the oxide material of the sheath is fired or sintered at reasonably high temperature such as in the usual case under cone 35 conditions an impervious body results. Zirconia can be satisfactorily sintered under cone 16 conditions. The only way I can define the imperviousness of the sheaths is to say that they will be satisfactory if they will hold water. This means that if the material of the sheath were made in the form of a vessel it would hold water.

EXAMPLE I

Alumina-Urania Disc

For the manufacture of the disc of FIGURES 1 and 2, I take for the core a mixture of 50% by weight (all percentages and parts herein are by weight unless the contrary is stated) of fine uranium dioxide and 50% of fine calcined alumina. The average particle size of the uranium dioxide is 325 mesh and finer with an average crystal size of half a micron. The average particle size of the alumina is 325 mesh and finer with an average crystal size of two to three microns. These materials are well mixed. The uranium is 92% $U^{235}$, the balance $U^{238}$ except for a trace of $U^{234}$.

To this mixture I add 7% of polyethylene glycol wax of 4000 average molecular weight in acetone solution, one part of wax to three parts of acetone. The uranium dioxide, the alumina, the wax and the acetone are thoroughly mixed and then the acetone is allowed to evaporate in the air which takes about half an hour, the total mixture being somewhat less than 100 grams.

The cake resulting from these operations is then crushed in a mortar and pestle and the resultant powder-wax mixture is placed in a 7/8 inch diameter mold of disc shape to make the core 11 and pressed to a thickness of 1/4 inch using a pressure of 5000 pounds per square inch. The amount of material charged into the mold is 8.6 grams.

Then another mixture is made which is 99% fine calcined alumina and 1% of a mixture of 25 parts of calcium carbonate, 25 parts of magnesia and 50 parts of silica. This material has the same particle size as the alumina of the core. This mixture is ball milled with water for six hours and then dried in an oven. This dry mixture cakes very little and needs no crushing. It is mixed with 12% of the same polyethylene glycol wax 50% water solution and then the further procedure, evaporating the water (by heat in an oven) then crushing the cake is followed.

I provide another cylindrical mold having an internal diameter of one and one-eighth inch and a thickness sufficient for the following operations. Three grams of the second mixture is placed in the bottom of this mold and spread evenly, then the core disc of uranium dioxide and alumina already formed is placed thereon, then the annular space between the core disc and the mold is filled with two grams of the powder, and three more grams of the powder is placed and spread evenly on top of the core disc. The mold is then closed and pressed with a pressure of 10,000 pounds per square inch to form the composite element of FIGURES 1 and 2, consisting of core 11 and sheath 12 with an outside thickness of three-eighths of an inch.

This composite element is then fired in hydrogen to 1750° C., heating slowly for five hours to 200° C. to eliminate the wax, then for fifteen hours to 1750° C. and holding it at 1750° C. for three hours, then cooling to below 100° over twenty four hours. The element is then complete. It shrinks in firing to $15/16$ inch diameter and $5/16$ inch thick.

EXAMPLE II

Zirconia-Urania Disc

To provide a disc-shaped ceramic nuclear fuel element sheathed with stabilized zirconia, I first make a stabilized zirconia powder by wet ball-milling 473.2 gm. of very pure zirconia (purified of hafnium) with 26.8 gm. of calcium carbonate, drying, and then calcining at 1100° C. for four hours. This calcine is wet ball-milled for three hours and dried. For sheathing I mix 250 gm. of this power with 25 gm. of polyethylene glycol which has been dissolved in methyl chloroform and allow the methyl chloroform to dry out in air and then crush the resultant cake.

For the core, I wet ball mill 224.25 gm. of the above stabilized zirconia powder with 25.75 gm. of $U_3O_8$ (enriched assay, i.e., the $U^{235}$ content of the uranium is 92%), and dry the mixture. The stabilized zirconia and uranium oxide mixture are then mixed with 25 gm. of polyethylene glycol in a methyl chloroform solution, dried, and the resultant cake crushed. The core is then formed by putting 10 gm. of this mixture in a ⅞ inch diameter mold and pressing at 1000 lbs. per square inch. A 1⅛ inch diameter mold is then filled with 4.5 gm. of the sheath material and levelled, then the core disc is placed in the center of the mold and on top of the sheath material. Then 3 gm. of sheath material is filled in the annular space between the mold and the core disc. Then 4.5 gm. additional sheath material is placed on top, levelled, the mold closed and pressed at 10,000 lbs. per square inch. This ceramic nuclear fuel element is then fired in hydrogen to 200° C. in four hours, then to 1450° C. in fifteen hours, held at 1450° C. for four hours, and cooled to below 100° C. in twenty-four hours, resulting in a disc ⅞ inch diameter by $7 1/16$ inch thick. I can also fire a similar disc in air to 1450° C. but prefer to use a hydrogen atmosphere.

EXAMPLE III

Magnesia-Urania Disc

This is prepared in all respects similar to the alumina clad disc of Example I except that the sheath material is preferably prepared by ball-milling fused magnesia for fifteen hours in isopropyl alcohol, drying, and then mixing polyethylene glycol as with alumina. Also, this ceramic nuclear fuel element is preferably fired in helium rather than hydrogen.

EXAMPLE IV

Cerium Oxide-Urania Disc

This is prepared in all respects similar to the stabilized zirconia clad disc except that it is fired in air to 1750° C. holding the temperature three hours.

EXAMPLE V

Thoria-Urania Disc

This is made in the same way as the ceria-urania disc except that the core is made of 50% thoria-50% urania and the thoria contains 0.5% $CaF_2$.

As a summary and guide to the scope of my invention I provide the following diagrammatic table giving the materials of the core and the sheath.

TABLE

Core:
    Ceramic oxide selected from fissionable and fertile material and mixtures—
        Fissionable material: $U^{235}$, $PU^{239}$, $U^{233}$
        Fertile material: $Th^{232}$, $U^{238}$ Core:
    Optional additional ceramic oxide material which includes mixtures of these oxides—
        Low nuclear captive cross sectional material
        Moderator—beryllia, BeO
        Other L.N.C.C.S.M.
        Alumina
        Magnesia
        Zirconia
        Lime
        Cerium Oxide
    Other ceramic oxides than above, not more than 5% by weight Sheath:
    Refractory metal oxide—
        Alumina
        Magnesia
        Stabilized zirconia, such as with 2% to 6% of lime or otherwise as known to the art
        Thoria
        Cerium oxide The core is made of ceramic oxide. It must have fissionable and/or fertile material. It may have other ceramic oxide material as indicated.

The sheath is made of refractory metal oxide of the group indicated or mixtures thereof. Up to five percent of other refractory oxide (e.g. the silica of Example I) can be tolerated. These other oxides, however, should have low nuclear cross section. Examples are silica, lime, titania, iron oxide (up to .3%), sodium oxide and potassium oxide.

Any of the shapes of FIGURES 3 to 6 can also be made with the materials of any of the examples and with other materials within the scope of the invention. Also nuclear fuel elements of many other shapes will be practical in many nuclear power plants.

The sheath protects the core from water or other heat exchange or cooling fluid. The sheath should cover all of the core.

Examples I to V inclusive represent the best modes (particularly Example I) contemplated by me for carrying out the invention. I have taken into consideration that in most cases the core should contain a large percentage of fissionable material as there will be more demand for elements having such cores. However, especially for blanket material, there is a demand for elements the cores of which contain normal uranium oxide with $U^{238}$ having only the normal amount of other isotopes and that is known as fertile material. Also blanket material having thoria cores are wanted. The elements I actually made had all of them the shape of FIGURES 1 and 2 and the cores contained only fertile material as above defined, because manufacture of elements with fissionable cores is dangerous except with very elaborate equipment not yet available to me. Hence I now give the following additional examples of elements actually made.

EXAMPLE VI

*Alumina-Urania Disc*

This is the same as Example I, except that the uranium of the uranium dioxide was $U^{238}$ with its normal content of other isotopes, .7% of $U^{235}$ and trace of $U^{234}$.

EXAMPLE VII

*Zirconia-Urania Disc*

This is the same as Example II, except that the uranium of the uranium dioxide was $U^{238}$ with its normal content of other isotopes as above stated.

In this invention, fuel element includes blanket material element, since the latter usually eventually produces fissionable material.

It will thus be seen that there has been provided by this invention a process of making a nuclear fuel element in which the various objects hereinabove set forth together with many thoroughly practical advantages are successfully achieved. As various possible embodiments may be made of the above invention and as many changes might be made in the embodiment herein illustrated and described, it is to be understood that all matter hereinbefore set forth or shown in the accompanying drawings is to be interpreted as illustrative and not in a limiting sense.

I claim:

The method of making a nuclear fuel element comprising providing finely divided refractory metal oxide including a substantial amount of radioactive material selected from the group consisting of fissionable and fertile material and mixtures thereof, adding an organic binder thereto for moldability, forming the mixture of metal oxide and organic binder into a core, completely surrounding the core formed with finely divided sheath forming material which is refractory metal oxide selected from the group consisting of alumina, magnesia, stabilized zirconia, ceria, thoria and mixtures thereof together with liquid for moldability, then compacting the sheath forming material and the core to produce a composite shape with the core inside of and completely surrounded by the sheath forming material, then firing the composite shape to an impervious integral nuclear fuel element.

References Cited in the file of this patent

UNITED STATES PATENTS

| | | |
|---|---|---|
| 2,814,849 | Hamilton | Dec. 3, 1957 |
| 2,818,605 | Miller | Jan. 7, 1958 |
| 2,907,705 | Blainey | Oct. 6, 1959 |
| 2,938,791 | Blainey | May 31, 1960 |

OTHER REFERENCES

Nucleonics, March 1956, pages 34–44.